US009529423B2

(12) United States Patent
Amsterdam et al.

(10) Patent No.: US 9,529,423 B2
(45) Date of Patent: Dec. 27, 2016

(54) SYSTEM AND METHOD TO MODIFY AUDIO COMPONENTS IN AN ONLINE ENVIRONMENT

(75) Inventors: Jeffrey D. Amsterdam, Marietta, GA (US); Rick A. Hamilton, II, Charlottesville, VA (US); Brian M. O'Connell, Cary, NC (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1458 days.

(21) Appl. No.: 12/331,650

(22) Filed: Dec. 10, 2008

(65) Prior Publication Data

US 2010/0146408 A1 Jun. 10, 2010

(51) Int. Cl.
*G06F 3/048* (2013.01)
*G06F 3/01* (2006.01)

(52) U.S. Cl.
CPC ........................... *G06F 3/011* (2013.01)

(58) Field of Classification Search
USPC .................................................. 715/706, 757
See application file for complete search history.

(56) References Cited

U.S. PATENT DOCUMENTS

| | | | |
|---|---|---|---|
| 5,736,982 A * | 4/1998 | Suzuki et al. | 715/706 |
| 5,889,223 A * | 3/1999 | Matsumoto | 84/609 |
| 6,987,514 B1 | 1/2006 | Beresin et al. | |
| 7,228,273 B2 | 6/2007 | Okunoki | |
| 7,250,944 B2 | 7/2007 | Anderson et al. | |
| 2001/0044725 A1 | 11/2001 | Matsuda et al. | |
| 2002/0073043 A1* | 6/2002 | Herman et al. | 705/64 |
| 2004/0075677 A1 | 4/2004 | Loyall et al. | |
| 2004/0159222 A1* | 8/2004 | Pennock et al. | 84/662 |
| 2005/0045025 A1 | 3/2005 | Wells et al. | |
| 2005/0075885 A1* | 4/2005 | Danieli | 704/276 |
| 2007/0168359 A1* | 7/2007 | Jacob et al. | 707/10 |
| 2007/0218987 A1 | 9/2007 | Van Luchene et al. | |
| 2007/0260984 A1* | 11/2007 | Marks et al. | 715/706 |
| 2008/0214253 A1* | 9/2008 | Gillo et al. | 463/1 |
| 2009/0240359 A1* | 9/2009 | Hyndman et al. | 700/94 |
| 2009/0253512 A1* | 10/2009 | Nickell et al. | 463/42 |

OTHER PUBLICATIONS

Everquest II User Manual, 2006, Sony, pp. 2-5.*

* cited by examiner

*Primary Examiner* — William Trapanese
(74) *Attorney, Agent, or Firm* — Lisa Ulrich; Andrew M. Calderon; Roberts Mlotkowski Safran Cole & Calderon P.C.

(57) ABSTRACT

A system and method to modify audio components in an online environment based on avatar characteristics and/or inventory items. The system includes a component to allow one or more audio modification algorithms to be selected. The system also includes a component to identify one or more avatar characteristics and a component to identify one or more avatar inventory items. The system further comprises a component to modify an audio communication in a virtual universe based on at least one of the one or more audio modification algorithms, the one or more avatar characteristics, and the one or more avatar inventory items.

27 Claims, 3 Drawing Sheets

SYSTEM AND METHOD TO MODIFY AUDIO COMPONENTS IN AN ONLINE ENVIRONMENT

FIELD OF THE INVENTION

The invention generally relates to a system and method to modify audio components in an online environment and, in particular, to modifying audio components based on avatar characteristics and/or inventory items.

BACKGROUND OF THE INVENTION

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example, Shared Space: the VU allows many users to participate at once;
Graphical User Interface: the VU depicts space visually, ranging in style from 2D "cartoon" imagery to more immersive 3D environments;
Immediacy: interaction takes place in real time;
Interactivity: the VU allows users to alter, develop, build, or submit customized content;
Persistence: the VU's existence continues regardless of whether individual users are logged in; and
Socialization/Community: the VU allows and encourages the formation of social groups such as teams, guilds, clubs, cliques, housemates, neighborhoods, etc.

Users may interact with one another in a VU using any number of communication methods. For example, users can communicate with one another via text and/or audio. Audio communications may include playing programmed sounds and/or transmitting a user's voice to other users participating in the VU. However, audio communications do not necessarily transmit user voices that are representative of the user's avatar.

SUMMARY OF THE INVENTION

In a first aspect of the invention, a system comprises hardware and software, the system comprises a component to allow one or more audio modification algorithms to be selected, a component to identify one or more avatar characteristics; and a component to identify one or more avatar inventory items. The system further comprises a component to modify an audio communication in a virtual universe based on at least one of the one or more audio modification algorithms, the one or more avatar characteristics, and the one or more avatar inventory items.

In another aspect of the invention, the method comprises modifying audio based on one or more of a sound modification algorithm, an inventory item, a characteristic, a user direction, and an object location. The method further comprises transmitting the audio communication to a receiver in a virtual universe and notifying the receiver that a modification has been applied.

In another aspect of the invention, a computer program product comprising a computer usable medium having readable program code embodied in the medium is provided. The computer program product includes at least one component operable to identify at least one of a sound modification algorithm, an inventory item, a characteristic, a user direction, and an object location; and modify an audio communication within a virtual universe based on at least one of the sound modification algorithm, the inventory item, the characteristic, the user direction, and the object location.

In yet another aspect of the invention, a method for deploying an application for modifying audio communications, comprises providing a computer infrastructure being operable to: providing a computer infrastructure being operable to: modify an audio communication in a virtual universe based on a sound modification algorithm, an inventory item, a characteristic, a user direction, and an object location; and transmit the audio communication.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention is directed to a system and method to modify audio components in an online environment and, in particular, to modifying audio components based on avatar characteristics and/or inventory items. More specifically, the system and method of the present invention enables users to customize audio modifications and rules or triggers that would cause the audio modifications to be performed while the user is participating in a VU. These triggers may be activated by avatar characteristics in, e.g., a fantasy type VU or temporary characteristics such as the avatar having a virtual cold. Moreover, in embodiments, the user may identify the location of certain audio objects within a VU and modify the audio properties of the audio objects by, e.g., increasing or decreasing the volume of the audio object.

A female user may be represented by a male avatar within a VU. The female user can audibly communicate through her avatar, however, the audio communication remains the user's real voice. Therefore, a female user will sound like a female while participating in a VU, despite communicating via a male avatar. Understandably, this detracts from the reality of the VU. In addition to detracting from the reality of the VU, the use of real world voices in a VU can pose privacy and/or security problems. For example, users within a VU may be hesitant to use their real voices because of fame or notoriety. Additionally, users may want to avoid using their real world voices in order to escape stereotypes, reputations, etc., that users may face or have in the real world. This allows users within a VU to become a new person and/or creature free of preconceived notions and/or inferences.

Additional modifications may be performed on characteristics relating to an avatar's age, gender, health, and/or species type, etc., and be used to help a user complete their virtual appearance by modifying their voice as heard by others. In embodiments, modifications may be triggered for different situations and can be changed just as an avatar's physical appearance can be changed for different situations. For example, a user may engage audio modifications for various noises produced within the VU that a user may or may not want to hear. This may be performed, e.g., by setting a trigger that blocks a transmission whenever the avatar is in range of the transmission.

A user may configure audio modifications through a VU client, which may affect both outbound audio transmissions and inbound audio receptions. The audio modifications may be stored as part of a user's profile and may be performed, e.g., by applying one or more audio modifications from a list of currently available audio modifications. The user may select the applied audio modifications from available audio modifications. In embodiments, the user may alter an available audio modification and/or create a new audio modification to be applied to one or more of an avatar's communications.

An avatar's audio communications may also be modified based on the characteristics and/or inventory of the communicating avatar. For example, a female user represented as a male avatar will have male characteristics within the VU. Therefore, the female user's audio communications may be modified to sound more masculine, thereby reflecting the masculine characteristics of her avatar. Similarly, an avatar's audio communications may be modified based on the communicating avatar's inventory items. For example, if a user's avatar wears a pair of "loud" shoes from inventory, the avatar's audio communications can be made to reflect the sounds associated with the avatar's movements while wearing the loud shoes.

Audio communications may also be modified based on the characteristics and/or inventory of the avatar receiving the audio communication. For example, a receiving avatar may alter communications coming from a gnome avatar to sound like a gnome, thereby increasing the reality of the user's experience. Likewise, one or more audio communications may be altered based on a receiving avatar's inventory. For example, an audio communication may be modified to sound muffled to a receiving avatar wearing, e.g., earplugs, noise canceling headphones, etc.

Additional modifications may be made to audio communications to make the user's VU experience more realistic. For example, audio communications may be altered based on the direction a user is facing, the identity and/or the location of an object within the VU, etc. Furthermore, a notification may be sent to one or more avatars receiving the audio in order for the receiving avatars to identify that modifications have been applied to an audio communication and further identify what types of modifications have been applied. By utilizing the system and method described herein, it is now possible to give users a more realistic experience while participating in a VU.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
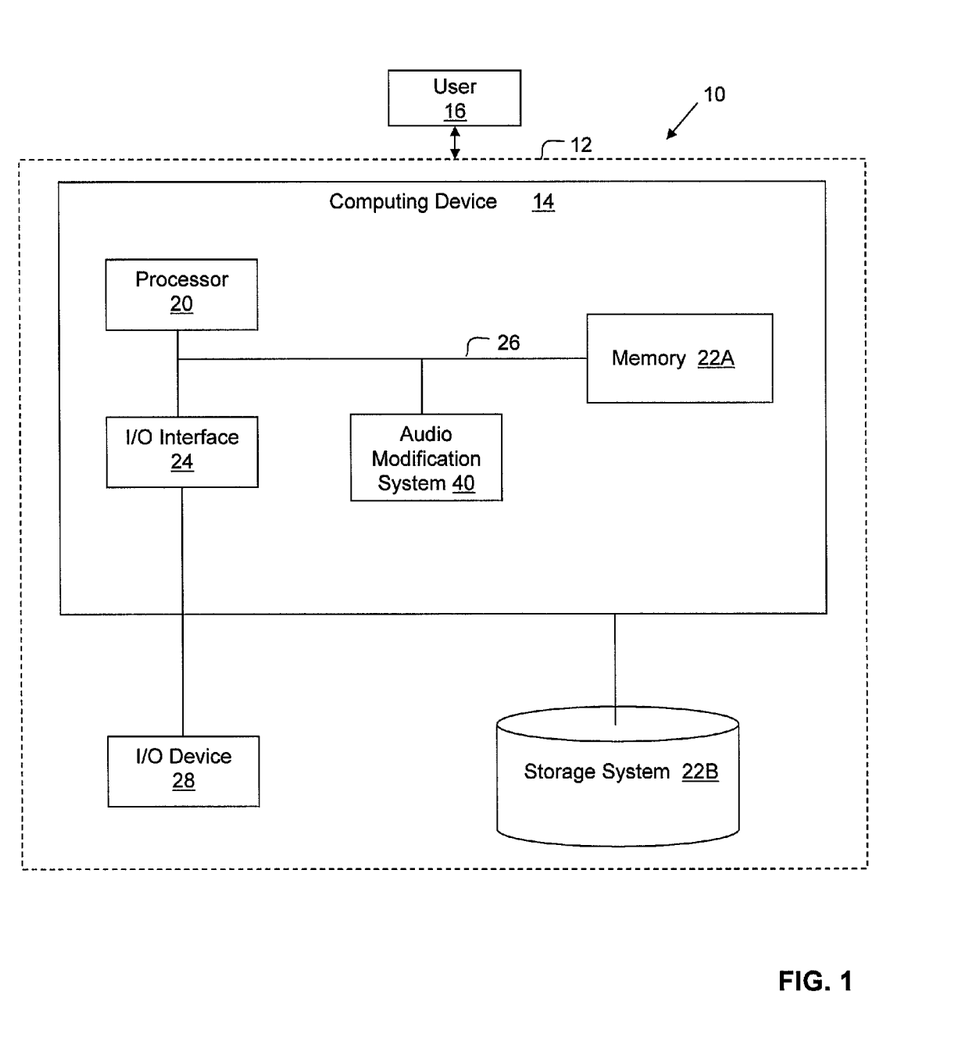
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an Audio Modification System 40, which makes computing device 14 operable to modify audio from an avatar or object within a VU, in accordance with the invention, e.g., process described herein.

The Audio Modification System 40 may be embodied as a feature of a VU and stored in memory 22A. The Audio Modification System 40 can include at least one program component to allow one or more audio modification algorithms to be selected; identify at least one of one or more avatar characteristics and one or more avatar inventory items; modify an audio communication in a virtual universe based on at least one of the one or more audio modification algorithms, the one or more avatar characteristics, and the one or more avatar inventory items; and/or transmit the modified audio communication.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc. The storage system 22B can include an "inventory" of sounds, modifications, etc., which may be selected by the user's avatar.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

Figure 2:
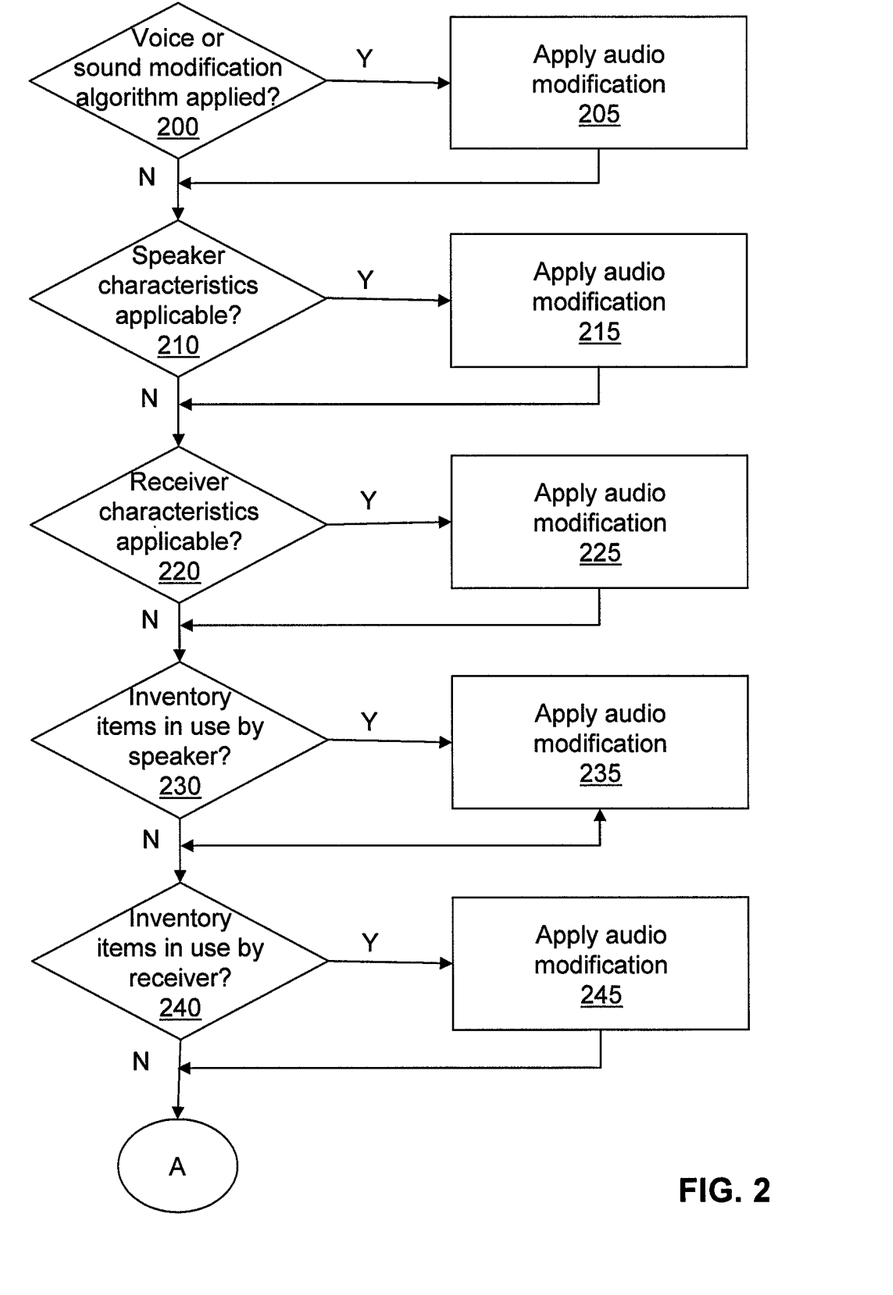
FIGS. 2 and 3 show flow charts of an exemplary process in accordance with aspects of the invention.
Figure 3:
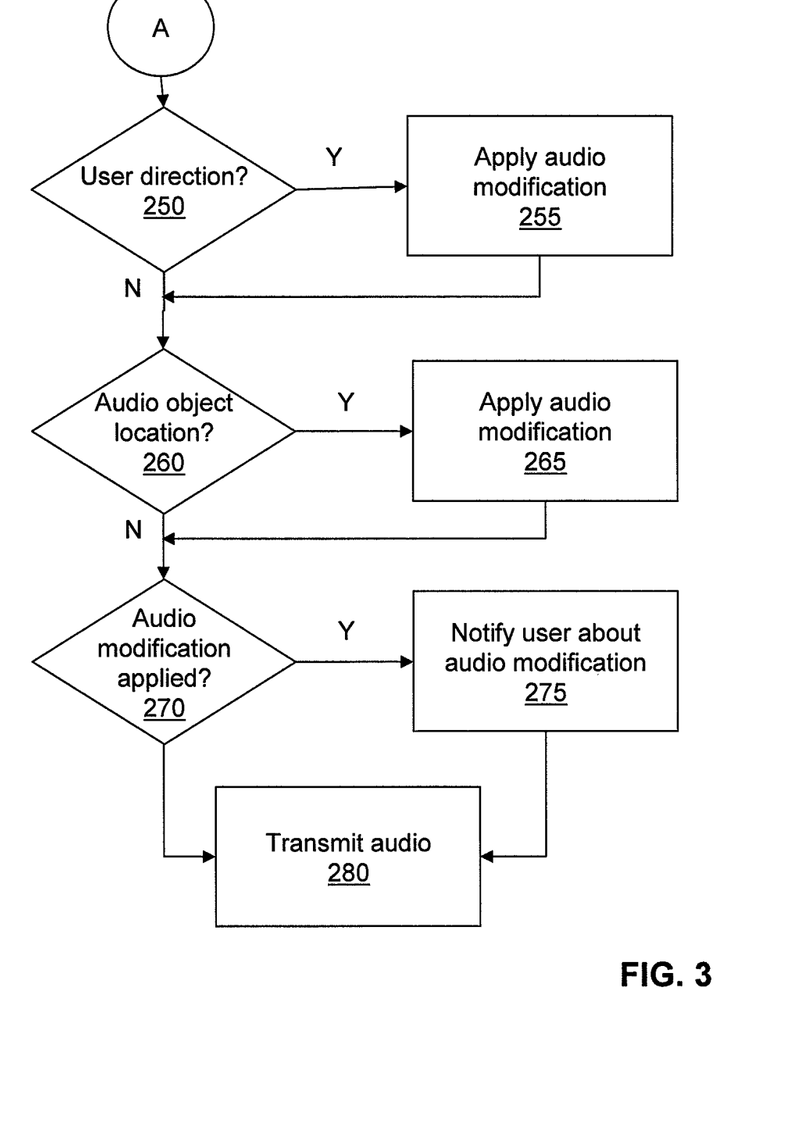

FIGS. 2-3 are flow charts implementing steps of the invention, which may be implemented in the environment of FIG. 1. FIGS. 2 and 3 may equally represent a high-level block diagram of the invention. The steps of FIGS. 2 and 3 may be implemented and executed from either a server, in a client server relationship, or they may run on a user workstation (which can be generally represented in FIG. 1) with operative information conveyed to the user workstation to information to be presented to a user. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

With respect to FIGS. 2 and 3, a number of determinations can be made as to whether audio modifications should be applied and/or what kind of modifications should be applied. Factors that may be considered in making these determinations include: inventories of voices or sound modification algorithms; speaking avatar characteristics; receiving avatar characteristics; speaking avatar inventory; receiving avatar inventory; user direction; and/or audio object location; etc. Any one or more of these factors may be utilized by the present invention.

While determinations may be related to a speaker, it should be understood by those skilled in the art that a speaker may comprise any human or non-human audio source configured to emit one or more sounds. Sounds may include, e.g., speaking, singing, humming, making noise in the background, playing music, etc. Sounds may also include audio communications from automated system messages and/or communications from objects containing an audio component. Moreover, a speaker may be used to refer to text that originates from an avatar that is converted to audio and transmitted to a receiving avatar and/or object.

The determinations in FIGS. 2 and 3 may be performed by the Audio Modification System 40 shown in FIG. 1. However, embodiments may perform one or more of these determinations using at least one other system. For example, a determination system or engine may be implemented to perform the determinations described in FIGS. 2 and 3. Also, each of the modification steps 205, 215, 225, 235, 245, 255, 265, and 275 may be a separate component implemented on the computer infrastructure of FIG. 1 or alternatively combined into any combination with the Audio Modification System 40 shown in FIG. 1.

Referring specifically to FIG. 2, a determination can be made as to whether a user has selected and/or designated a voice or sound modification algorithm to be applied to the user's voice, at step 200. A voice or sound modification may affect inbound and/or outbound audio receptions and be stored as part of a user's profile.

The applicability of a voice or sound modification may be determined in a number of ways. For example, in embodiments, a tag or parameter can be associated with a user profile. This tag or parameter can indicate whether one or more modification algorithms should be applied and designate the applicable audio modifications. The tag or parameter may enable a user to load multiple audio modification routines into the user's profile.

Once a determination has been made as to whether one or more voice or sound modification algorithms have been selected and/or designated by the user, the applicable voice or sound modification algorithm can be applied, at step 205. The application of one or more voice or sound modification algorithms may result in any number of changes to an audio communication. For example, voice or sound modification algorithms may be used to change a user's vocal patterns and/or characteristics of a sound based on one or more audio properties. These audio properties may include, e.g., pitch, loudness, duration, spectral morphing, warping, etc. Moreover, in embodiments, additional audio properties, such as pitch frequency modulation, may also be used for audio synthesis.

Exemplary uses of audio properties may include changing the pitch of an audio communication to make the audio communication sound more feminine or masculine. The pitch of an audio communication may also be adjusted to create a warble affect, which may make the audio communication sound older. Further modifications may include, for example, creating an echo by delaying and then repeating the audio communication and/or morphing one or more audio spectrums together. Additional modifications may be performed to affect the timbre or tone quality of an audio communication using one or more audio synthesis techniques such as pitch frequency modulation. Methods known to those skilled in the art may also be used to modify audio communications in addition to the examples described herein.

The voice or sound modification algorithms applied, at step 205, may be created by one or more users, VUs, administrators, etc. Once created, the voice or sound modification algorithms may be indexed and stored by the VU (e.g., in storage 22B or other storage) and applied to one or more users, which may include all users or a specified subset of users participating in a VU. For example, a list or index of one or more voice or sound modification algorithms may be presented to a user. The user may select any number of the voice or sound modification algorithms from the list or index and have them applied to the user's audio communications. In embodiments, a service provider, VU, user, etc., may charge a fee for the use of one or more of the voice or sound modification algorithms. The selected and/or created voice or sound modification algorithms may be used each time a user participates in a VU or in limited instances when designated by the user, e.g., on an ad hoc basis.

The process continues to step 210 where, for example, the program component makes a determination as to whether a speaker's characteristics are to be used in the VU (compared to the speaker's actual characteristics). In embodiments, this determination may be performed by the user. Characteristics can be defined by the user, VU, administrator, etc., and may include, e.g., characteristics relating to the gender, age, and/or species of a user's avatar in a VU. Further characteristics may also include the health of the user, e.g., if the user is breathing hard or wheezing, etc.

In one example, using the avatar's characteristics, a service provider, VU, etc., may create a sampling of the user's real voice. This sampling can be compared to characteristics of the user's avatar. If the sampling matches the avatar's characteristics, no modifications may be necessary. However, if the user's real voice is different from the characteristics of the user's avatar, the user's audio communications may be altered to reflect the avatar's characteristics. For example, a female user participating in a VU will have a feminine voice. However, if the female user's avatar is a male ogre, for example, the characteristics of the avatar are those of a male ogre. Since the female user's voice is different than a male ogre's voice, characteristics applicable to a male ogre's voice would be applied to the female user's audio communications, at step 215. This allows the user's voice to be modified to better reflect the characteristics of the user's avatar.

The process continues to step 220 where, for example, the program component makes a determination as to whether the receiving user has characteristics that would modify the speaker's (avatar) sound. This determination may be performed by checking the source of the audio against matching items in the user's profile and applying one or more designated modifications in the user's profile. In embodiments, these modifications may be applied when an avatar comes within a specified range and/or when the avatar begins communicating with the receiving user. Moreover, in embodiments, specifying a group of avatars may also trigger an audio modification.

The receiving user's characteristics may be illustrative of how the receiving user wants incoming audio communications to sound. For example, a receiving user can identify one or more characteristics in a speaking avatar, such as the avatar's age, gender, or species. The receiving avatar can modify a speaker's voice or sound to fit the identified speaker characteristics, at step 225. For example, a receiver can modify a voice or sound coming from an elfin creature to sound like an elf. Modifications may be made on an ad hoc basis. Embodiments may also make modifications to one or more specified avatars.

The process continues to step 230 where, for example, a program component makes a determination as to whether one or more inventory items are in use by a speaker's avatar. If the user has certain types of items in inventory then the inventory items may be used to modify a speaker's audio communication. The number and/or type of inventory items that may be used to modify audio communications may vary in embodiments. For example, in embodiments, a speaker's voice or sounds coming from the speaker can be modified if the speaker is using a megaphone from inventory. Likewise, the sounds coming from the speaker may be modified if, e.g., the speaker is wearing specific types of shoes from inventory, such as tap dance shoes, which may trigger a tapping sound as the user's avatar walks around the VU.

Voice and sound modifications can be performed if an avatar displays an item in inventory or merely possesses an item in inventory. For example, if an avatar is wearing a costume from inventory, the avatar's voice or sound may be modified to reflect the costume the avatar is wearing. Similarly, if the avatar possesses a number of geographic specific items, the avatar's voice or sound may be modified to reflect the specific geographical region. For example, if the avatar includes numerous New York sports memorabilia, a New York City t-shirt, and a New York keychain in inventory, a New York accent may be applied to the user's audio communication. Embodiments may permit users to accept, reject, and/or modify audio changes based on inventory items. Once accepted and/or modified, applicable audio modifications may be applied, at step 235.

The process continues to step 240 where, for example, the program component makes a determination as to whether the receiver has one or more items in inventory that could modify how the receiver hears voices or sounds coming from the speaker. Any type of inventory item can be used to trigger audio modifications sent to an avatar. For example, modifications may be based on what inventory items the receiving avatar is actually using. For example, if a receiving avatar is wearing ear-muffs, sounds coming from a speaker and/or the speaker's voice may be muffled because of the ear-muffs. If such inventory items are used by the receiving speaker, the speaker's voice or sound can be modified according to the receiving avatar's inventory items, at step 245.

The process continues to step 250 where, for example, the program component determines the direction a user is facing. Different voice or sound modifications may be performed based on the direction a speaking avatar is facing, at step 255. For example, if an avatar may represent one character when facing a first direction and another character when facing a second direction. The speaker can set ad hoc commands for temporarily or permanently activating an audio modification routine when the avatar faces a particular direction. Once set, one or more of the ad hoc commands can be changed by the user via any number of available interfaces such as, e.g., pressing a key, selecting a menu option, etc.

The process continues to step 260 where, for example, the program component determines the location of an audio object. The location of an audio object can be determined based on the distance the audio object is from the receiving avatar. Modifications can be applied to audio objects based on the location of the audio object, at step 265. For example, sound modifications may be performed on loud or quiet audio sources to bring the audio into a comfortable listening level. Thus, an alarm system broadcasted through a VU can be modified to be broadcasted at a lower audio or muted. The modification may be permanent or temporary. The modification may be performed by the user, however, embodiments may allow the modifications to be performed by an administrator and/or by the VU. Additionally, embodiments may make modifications automatically and/or semi-automatically based on user preferences and/or past modifications performed on similar objects. One or more modifications may be stored, e.g., in a database such as 22B, and subsequently triggered the next time an avatar is in the vicinity of the audio object so readjustment is not necessary.

The process continues to step 270 where, for example, the program component determines whether an audio communication and/or sound has been modified. This determination may be useful in a number of situations where voice authenticity is important such as, e.g., business meetings in a VU.

If the audio communication and/or sound has been modified then a notification may be sent to the receiving avatar indicating one or more modifications have been applied, at step 275. This notification may be made to all avatars receiving the communication or only to those avatars requesting a notification. The notification may be visual and/or audio. For example, a visual notification in the form of a text box or message may be presented to a receiving avatar. The text box or message may include a notification that audio modifications have been made to the communication and, in embodiments, a list of the audio modifications applied to the communication. Additional examples of visual notifications may include a marker, which may be displayed on or otherwise associated with the communicating avatar. However, it should be understood that any number of visual notifications known to those skilled in the art may be used instead of or in addition to the exemplary visual notifications described herein. In addition to visual notifications, audio notifications may be used to notify one or more avatars that an audio communication has been modified. Audio notifications may be in the form of a single sound, a series of sounds, and/or an audio message indicating the avatar's communication has been modified, etc.

Visual and/or audio notifications may be presented each time an avatar communicates with another avatar via a modified audio communication. Optionally, embodiments may notify a receiving avatar of a modified audio communication only during an initial communication or set of communications. In embodiments, the notification may be sent periodically and/or when an audio modification is detected by an avatar or identified by a VU. For example, upon detecting an audio modification, a VU can send a notification to all avatars or a subset of avatars that are receiving the modified audio communication.

In addition to notifying an avatar that an audio communication has been modified, embodiments may also notify the avatar of the specific modifications that have been used to modify the audio communication. The user can then select whether to hear the modified audio communication or the original, unmodified audio communication. Embodiments may also allow a user to accept one or more modifications and remove other modifications. For example, if an avatar has finished running a virtual marathon, audio communications from the avatar may be adjusted to make the avatar sound out of breath. Although making the communication more realistic, this audio modification may make the avatar's communication unclear to one or more avatars. Thus, an avatar can choose to disregard one or more audio modifications associated with making the avatar sound out of breath. This may be done, for example, by receiving an audio communication, identifying the modifications to the audio communication, and removing one or more unwanted modifications by applying one or more functionally opposite modifications. The identification of the modifications may be sent with the audio communication and/or decoded using known methods to those skilled in the art. To satisfy any privacy concerns, embodiments may only allow hearing original, unmodified audio communication if the speaker avatar gives permission by default or upon request. Permissions may be managed via an interface with any granularity of options known in the field of permissions.

Embodiments may transmit multiple versions of an audio communication at the same time. For example, embodiments may transmit a modified audio communication via a first channel, an unmodified audio communication via a second channel, and/or a partially modified audio communication via a third channel, etc. These audio channels may be designated by the user, an administrator, and/or a VU. Thus, for example, a speaking avatar may apply a first audio modification to be sent to a first avatar via a first channel, a second audio modification to be sent to a second avatar via a second channel, etc., such that the first and second avatars receive different modifications of the same audio communication.

At step 280, the modified audio communication can be transmitted to one or more avatars upon completion of one or more of steps 205, 215, 225, 235, 245, 255, 265, and 275. However, it should be understood by those skilled in the art that an audio communication may be transmitted having any number of modifications or no modification at all. Similarly, while a number of modifications have been described, one skilled in the art should understand that additional or fewer modifications may be included in embodiments. For example, embodiments may not include one or more of the aforementioned audio modifications. Further, embodiments may add additional modifications such as a location accent modification wherein an avatar's audio communication can be modified to reflect an accent associated with the geographic location the avatar is at or a geographic location of the avatar's choice. Additional modification may, e.g., allow an avatar to apply a first audio modification to communications occurring before a predetermined time and a second, third, and/or fourth, etc., audio modification to communications occurring after a predetermined time. Moreover, embodiments may allow an avatar to adjust the volume of the incoming or outgoing audio communication for easy listening.

Exemplary Embodiments

Further embodiments are contemplated by the present invention. For example, in embodiments, audio modifications may be processed when audio is transmitted or received by the avatar. The processing may include comparing the avatar's properties, such as location, health status, etc., to the avatar's stored settings and modifying the audio according to the parameters in the avatar's stored settings.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. An audio modification system comprising hardware and software, the system comprising:
   a component configured to allow one or more audio modification algorithms to be selected for a speaking avatar;
   a component configured to determine whether characteristics of the speaking avatar are to be used for an audio modification, the determination comprising:
      creating a sampling of a real voice of a user of the speaking avatar;
      comparing the sampling to the characteristics of the speaking avatar;
      when the sampling does not match the characteristics of the speaking avatar, then selecting the characteristics of the speaking avatar for the audio modification of the real voice of the user; and
      when the sampling does match the characteristics of the speaking avatar, then selecting the real voice of the user for voice audio from the speaking avatar;
   a component configured to identify characteristics of a receiving avatar comprising first characteristics of the receiving avatar and second characteristics of the speaking avatar that are identified by the user of the receiving avatar;
   a component configured to identify one or more inventory items that are in use by the speaking avatar or the receiving avatar; and
   a component configured to modify an audio communication in a virtual universe based on the determination of whether the characteristics of the speaking avatar are to be used for the audio modification, the characteristics of the receiving avatar, and at least one of the one or more audio modification algorithms and the one or more inventory items;
   wherein the identifying the one or more inventory items comprises:
      determining whether one or more inventory items are in use by the speaking avatar, and determining whether one or more inventory items are possessed by the speaking avatar but not in use by the speaking avatar;
      determining whether one or more inventory items are in use by the receiving avatar, and determining whether one or more inventory items are possessed by the receiving avatar but not in use by the receiving avatar;
   a component configured to modify an audio communication in a virtual universe based on the determination of whether the characteristics of the speaking avatar are to be used for the audio modification, the characteristics of the receiving avatar, the one or more audio modification algorithms, the one or more inventory items in use by the speaking avatar, the one or more inventory items possessed by the speaking avatar, the one or more inventory items in use by the receiving avatar, and the one or more inventory items possessed by the receiving avatar;

the system further comprising a component to:
  notify the receiving avatar that the audio communication has been modified, the notify comprising identifying the specific modifications applied to the audio communication to the user of the receiving avatar; and
  removing one or more of the specific modifications based on input received from the user of the receiving avatar; and
the removing the one or more of the specific modifications comprises applying one or more functionally opposite modifications to the audio communication.

2. The system of claim 1, wherein the one or more audio modification algorithms are selected by the user, an administrator, or the virtual universe.

3. The system of claim 1, further comprising at least a component to alter the audio communication based on a direction the speaking avatar is facing, or a component to automatically modify an audio object based on one or more previous modifications.

4. The system of claim 1, wherein a modified audio component is transmitted on a first audio channel and an unmodified audio component is transmitted on a second audio channel.

5. The system of claim 1, wherein the system is at least one of supported, deployed, maintained, and created by a service provider.

6. The system of claim 1, wherein:
  the audio communication originates from an object within the virtual universe;
  the system further comprises a component configured to notify the receiving avatar about the modified audio communication audibly;
  the characteristics of the speaking avatar comprise an avatar age, gender, health, and species;
  the audio communication is transmitted to the receiving avatar; and
  the characteristics of the receiving avatar comprise how the receiving avatar wants the audio communication to sound.

7. A method for modifying audio implemented on a computer infrastructure and embodied on a computer readable storage medium comprising:
  determining whether characteristics of a speaking avatar are to be used for an audio modification, the determination comprising:
    creating a sampling of a real voice of a user of the speaking avatar;
    comparing the sampling to the characteristics of the speaking avatar;
    when the sampling does not match the characteristics of the speaking avatar, then selecting the characteristics of the speaking avatar for the audio modification of the real voice of the user; and
    when the sampling does match the characteristics of the speaking avatar, then selecting the real voice of the user for voice audio from the speaking avatar;
  modifying an audio communication based on the determination of whether the characteristics of the speaking avatar are to be used for the audio modification, the characteristics of at least one receiving avatar comprising a first characteristic related to the at least one receiving avatar and a second characteristic related to the speaking avatar that is identified by a user of the at least one receiving avatar, and an inventory item possessed by the receiving avatar but not in use by the receiving avatar;
  transmitting the audio communication to the at least one receiving avatar in a virtual universe; and
  notifying the at least one receiving avatar that a modification has been applied.

8. The method of claim 7, wherein modifying the audio communication is further based on an inventory item related to the speaking avatar.

9. The method of claim 7, wherein the modifying is permanent or ad hoc.

10. The method of claim 7, wherein the audio communication originates from the speaking avatar or an object within the virtual universe.

11. The method of claim 7, wherein the method is at least one of supported, deployed, maintained, and created by a service provider.

12. The method of claim 7, comprising:
  identifying the audio communication originating from the speaking avatar or an object within the virtual universe;
  identifying one or more audio modifications, which include the characteristics of the speaking avatar, the sound modification algorithm, the inventory item, the first characteristic, the second characteristic, the user direction, and the object location;
  determining whether at least one of the one or more audio modifications are applicable to the audio communication;
  applying at least one of the one or more audio modifications to the audio communication;
  transmitting the audio communication, wherein the transmitted audio communication is one of modified or unmodified; and
  notifying the at least one receiving avatar about at least one of the one or more audio modifications visually or audibly.

13. The method of claim 7, wherein:
  the audio communication originates from an object within the virtual universe;
  the method further comprises notifying the at least one receiving avatar about the modification audibly;
  the characteristics of the speaking avatar comprise an avatar age, gender, health, and species; and
  the characteristics of the at least one receiving avatar comprise how the at least one receiving avatar wants the audio communication to sound.

14. The method of claim 7, wherein modifying the audio communication comprises modifying an inbound audio communication.

15. A computer program product comprising a tangible computer usable storage medium having readable program code embodied in the tangible storage medium, the computer program product includes at least one component operable to:
  determine whether characteristics of a speaking avatar are to be used for an audio modification, the determination comprising:
    creating a sampling of a real voice of a user of the speaking avatar;
    comparing the sampling to the characteristics of the speaking avatar;
    when the sampling does not match the characteristics of the speaking avatar, then selecting the characteristics of the speaking avatar for the audio modification of the real voice of the user; and when the sampling does match the characteristics of the speaking avatar, then selecting the real voice of the user for voice audio from the speaking avatar;

identify a characteristic related to at least one receiving avatar and at least one inventory item possessed by the receiving avatar but not in use by the receiving avatar; and modify an audio communication within a virtual universe based on the determination of whether the characteristics of the speaking avatar are to be used for the audio modification, the characteristic related to the at least one receiving avatar and the at least one inventory item, wherein the audio communication is modified by altering at least one of pitch, loudness, duration, spectral morphing, and warping.

16. The computer program product of claim 15, wherein audio communication is modified before or after transmission.

17. The computer program product of claim 15, wherein modifying the audio communication is further based on an inventory item related to the speaking avatar.

18. The computer program product of claim 15, wherein the computer program product is at least one of supported, deployed, maintained, and created by a service provider.

19. The computer program product of claim 15, comprising at least one component to:
identify the audio communication originating from the speaking avatar or an object within the virtual universe;
identify one or more audio modifications, which include the characteristics of the speaking avatar the inventory item, and the characteristic related to the at least one receiving avatar;
determine whether at least one of the one or more audio modifications are applicable to the audio communication;
apply at least one of the one or more audio modifications to the audio communication;
transmit the audio communication, wherein the transmitted audio communication is modified or unmodified; and
notify the at least one receiving avatar about at least one of the one or more audio modifications visually or audibly.

20. The computer program product of claim 15, wherein:
the audio communication originates from an object within the virtual universe;
the at least one component is further operable to notify the at least one receiving avatar about the modified audio communication audibly;
the characteristics of the speaking avatar comprise an avatar age, gender, health, and species;
the audio communication is transmitted to the at least one receiving avatar; and
the characteristic related to the at least one receiving avatar comprises how the at least one receiving avatar wants the audio communication to sound.

21. A method for deploying an application for modifying audio communications, comprising:
providing a computer infrastructure being operable to:
determine whether characteristics of a speaking avatar are to be used for an audio modification, the determination comprising:
creating a sampling of a real voice of a user of the speaking avatar;
comparing the sampling to the characteristics of the speaking avatar;
when the sampling does not match the characteristics of the speaking avatar, then selecting the characteristics of the speaking avatar for the audio modification of the real voice of the user; and
when the sampling does match the characteristics of the speaking avatar, then selecting the real voice of the user for voice audio from the speaking avatar;
modify an audio communication in a virtual universe based on the determination of whether the characteristics of the speaking avatar are to be used for the audio modification, a sound modification algorithm, an inventory item in possession of, but not used by, at least one receiving avatar, a first characteristic related to the at least one receiving avatar, a second characteristic related to at least one speaking avatar that is identified by a user of the at least one receiving avatar, a user direction, and an object location; and
transmit the audio communication.

22. The method of claim 21, wherein the sound modification algorithm is selected by the user of the speaking avatar.

23. The method of claim 21, wherein the computer infrastructure is further operable to identify one or more modifications to the audio communication and notify a third party of the one or more modifications.

24. The method of claim 21, wherein the modifying the audio communication is further based on an inventory item related to the speaking avatar.

25. The method of claim 21, wherein the one or more modifications are related to an avatar age, gender, health, or species.

26. The method of claim 21, wherein the computer infrastructure is at least one of supported, deployed, maintained, and created by a service provider.

27. The method of claim 21, wherein:
the audio communication originates from an object within the virtual universe;
the computer infrastructure is further operable to notify the at least one receiving avatar about the modified audio communication audibly;
the characteristics of the speaking avatar comprises an avatar age, gender, health, and species;
the audio communication is transmitted to the at least one receiving avatar; and
the second characteristic comprises how the at least one receiving avatar wants the audio communication to sound.

* * * * *